(12) United States Patent
Rouchouze

(10) Patent No.: US 8,624,842 B2
(45) Date of Patent: Jan. 7, 2014

(54) PROJECTED AND SECURED VIRTUAL KEYBOARD

(75) Inventor: Bruno Rouchouze, St Cyr sur Mer (FR)

(73) Assignee: Gemalto SA, Meudon (FR)

(*) Notice: Subject to any disclaimer, the term of this patent is extended or adjusted under 35 U.S.C. 154(b) by 331 days.

(21) Appl. No.: 13/129,977

(22) PCT Filed: Aug. 27, 2009

(86) PCT No.: PCT/EP2009/061057
§ 371 (c)(1),
(2), (4) Date: May 18, 2011

(87) PCT Pub. No.: WO2010/057692
PCT Pub. Date: May 27, 2010

(65) Prior Publication Data
US 2011/0221681 A1    Sep. 15, 2011

(30) Foreign Application Priority Data
Nov. 18, 2008 (EP) .................................. 08305813

(51) Int. Cl.
*G09G 5/00* (2006.01)
(52) U.S. Cl.
USPC ........................................................ 345/168
(58) Field of Classification Search
None
See application file for complete search history.

(56) References Cited

U.S. PATENT DOCUMENTS

| 5,008,847 A | 4/1991 | Lapeyre |
| 6,169,538 B1 | 1/2001 | Nowlan et al. |
| 6,209,104 B1 | 3/2001 | Jalili |
| 2002/0171633 A1* | 11/2002 | Brinjes ......................... 345/168 |

FOREIGN PATENT DOCUMENTS

| EP | 0 980 039 A2 | 2/2000 |
| FR | 2 834 157 A1 | 6/2003 |
| WO | WO 99/14657 A1 | 3/1999 |

OTHER PUBLICATIONS

International Search Report (PCT/ISA/210) issued on Nov. 18, 2009, by European Patent Office as the International Searching Authority for International Application No. PCT/EP2009/061057.
Written Opinion (PCT/ISA/237) issued on Nov. 18, 2009, by European Patent Office as the International Searching Authority for International Application No. PCT/EP2009/061057.

* cited by examiner

*Primary Examiner* — Adam R Giesy
(74) *Attorney, Agent, or Firm* — Buchanan Ingersoll & Rooney PC

(57) ABSTRACT

The invention relates to a method for inputting a text in a distributed system that comprises a secured device, or server, communicating with at least one electronic device, or terminal. The method makes it possible to prepare an image by associating certain values to areas defining said image. The image is projected to the user who can touch the areas of the images that he wants to select as he would do with the keys of keyboard. The finger movements are analysed and the position of the virtual keys selected by the user is transmitted to the server that establishes a correlation between these positions and the previously associated values.

12 Claims, 4 Drawing Sheets

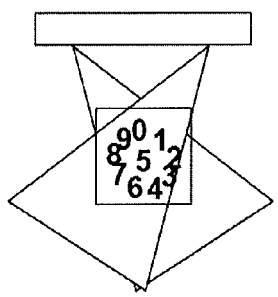
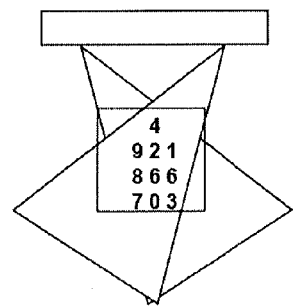
Fig. 3       Fig. 4
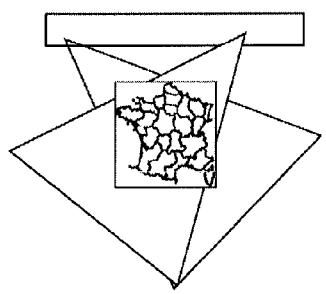
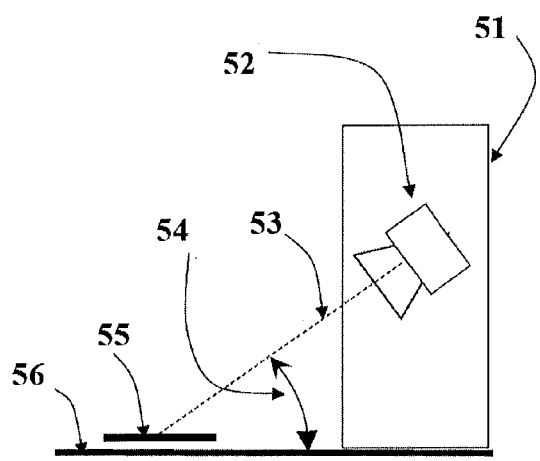
Fig. 5       Fig. 6

PROJECTED AND SECURED VIRTUAL KEYBOARD

BACKGROUND OF THE INVENTION

The invention relates to a projected and secured virtual keyboard.

The invention more particularly relates to a method for inputting a text based on the positioning space of the fingers while referring to a projected image.

The European patent EP980039 describes a method for inputting characters through a virtual keyboard. A virtual keyboard is a means for inputting texts in the absence of a peripheral unit including one key per character and which is more particularly intended for equipment such as interactive television, cellular phones or personal terminals PDAs. Virtual keyboards can also be applied in the field of secured exchanges.

Patent PCT W09914657 is known in the state of the art and discloses a virtual keyboard used on a computer screen to emulate a conventional keyboard. The coordinates of the keys of the virtual keyboard are stored in a memory as a table, by the computer. The key coordinates are sorted in the table as a function of their occurring frequency. A pointing device makes it possible to select the keys on the virtual keyboard. The input points generated by the pointing device are compared one by one to the coordinates of the keys kept in the coordinates table. To decide whether the input point matches a considered key, defined criteria are applied to a terminal function. If they match, the key is affected to the input point and the search stops. The search for the matching key goes on until a match is detected or until the end of the table.

The American patent U.S. Pat. No. 5,008,847 discloses another type of virtual keyboard including a means of selection by a cursor moved on a graphic representation of a keyboard.

These prior art solutions have the drawback of having a fixed geometry and of being easily spied on within the scope of the inputting of secret information. In addition, the prior art solutions are particularly vulnerable in case of presence of an hostile module on the electronic device in charge of presenting the virtual keyboard.

BRIEF SUMMARY OF THE INVENTION

The object of the present invention is to remedy this drawback by providing a secured method for inputting a text using a virtual keyboard.

Firstly, the invention is a method for inputting a text in a distributed system that comprises at least a secured device called a server, communicating with at least one electronic device called the terminal, and the method includes at least:
  a step of pre-calculation wherein at least one look-up table is established an image, at least an area of the image, and at least a value,
  a step of transmission of the image from the server to the terminal,
  a step of projection by the terminal of the image towards the user,
  a step of identification of the positions in space of the user's fingers in relation with the projection of the image,
  a step of restitution of the positions in space to the server,
  a step of interpretation by the server of the positions received in relation with the look-up table so as to obtain values of so-called candidate values.

The projection can be executed against a surface which is used as a screen.

In one embodiment, the image shows several geometrically distinct areas. Such areas can form a set of keys.

In one embodiment, the look-up table makes it possible to apply the positions to a second image.

In one embodiment, the look-up table makes it possible to apply shifts to the positions so as to obtain corrected positions.

In one embodiment, the method also includes a previous step during which the image can either be selected among a list of images saved in a memory which can be accessed by the server, or generated.

The invention is also a terminal for inputting a text in relation with at least one secured device called a server, this terminal includes means for
  receiving from the server an image
  projecting this image onto a support to a user
  identifying the positions in space of the user's fingers in relation with the projection of the image
  restituting the positions in space to the server.

In one embodiment, the means of identification of the positions in space of the user's fingers can be video capture means, pressure sensors positioned in said projection medium or radar emitters and receivers.

The advantage of the invention is that the image sent by the server is not interpreted by the terminal. As a matter of fact, since the image is monolithic and not dissociated into areas, it makes the terminal unable to interpret the fingers positions that it noted.

Now, the method is particularly adapted to a case where the server does not trust the terminal.

BRIEF DESCRIPTION OF THE DRAWINGS

Other characteristics and advantages of the invention will clearly appear upon reading the following description thereof, which is given as an indication and not as a limitation, while referring to the appended drawings wherein:

FIG. 3 shows an exemplary image which can be used by the invention wherein the graphic areas showing the keys are positioned in a circle;

FIG. 4 shows an exemplary image which can be used by the invention wherein the graphic areas showing the keys are mixed;

FIG. 5 shows an exemplary image which can be used by the invention wherein the graphic areas showing the keys are shown as a geographic map;

FIG. 6 is an illustration of an implementation of the invention where the projection of the image makes a positive angle with the supporting angle;

DETAILED DESCRIPTION OF THE INVENTION

The invention may be schematically and not limitatively a method for inputting a text in a distributed system that comprises at least a secured device called a server, communicating with at least one electronic device called the terminal.

This method can, among other things, make it possible to prepare an image by associating values with some areas which it is composed of.

This image is projected to the user which will touch the areas of the image he wishes to select, as he would do for the keys of a keyboard.

The motions of the fingers are analysed and the positions of the virtual keys that he selected are transmitted to the server which will make the correlation between these positions and the previously associated values.

Figure 1:
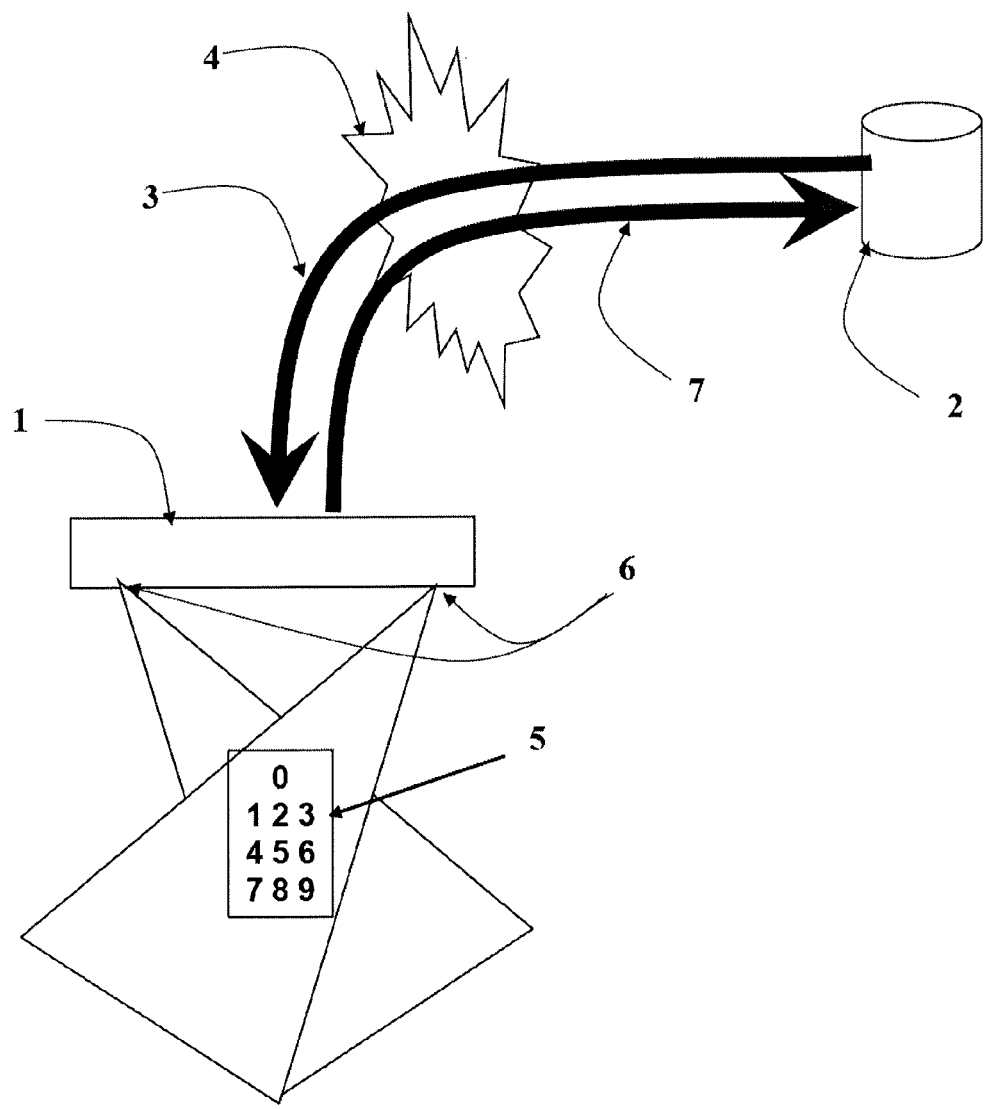
FIG. 1 shows an exemplary implementation of the invention.

Thus, FIG. 1 illustrates an implementation of the invention wherein a user tries to access a remote service, hosted by a server 2, via a network 4. In order to authentify the user, the server 2 transmits 3 an image to a terminal 1 which is directly in contact with the user. This terminal is provided with means making it possible to display 5 the received image to the user's view. In the example illustrated in FIG. 1, the display of the image is executed by a projection onto a medium. In a previous step, the server 2 "builds" the image by identifying thereon particular areas which information is associated with. An example is the image of a numeric keypad and to each one of the areas matching each one of the keys is associated the value of a key. In another example, a geographic map of a country can be divided into areas and a value can be affected to each one of these areas. According to the embodiments, the correlation information between the image and the areas and the associated values can be stored in a memory of the server or in any other memory accessible by the server.

In one particularly advantageous implementation of the invention, this correlation information can be saved in a secured electronic device. This secured electronic device can be for example a secured mobile device giving independence to the functionality of the server and of the server hardware. Any communicating electronic device may potentially become a server if it is placed in contact with the secured mobile device which contains the correlation information.

The terminal 1 is provided with means making it possible to analyse the motions about the projection 5. This analysis includes several steps and several devices. As a matter of fact, such an analysis includes a capture of motions close to the displayed image 5 and the analysis thereof in order to extract positions from said inputs. Such inputting positions will represent the selection by the user of geographic areas of the image 5. A particularly explicit illustration of this analysis is given by the example where the image 5 shows a computer keypad. The user puts his fingers close to the surface of the image 5 and places his fingers on the areas of the image which correspond to the keys of the digital code he wants to input. Then, the analysis according to the invention consists in capturing the motions of the user's fingers close to the image 5 of the digital keyboard 5, and analyses these so as to provide positions corresponding to the areas touched by the user.

In the example illustrated in FIG. 1, such an analysis can be executed by using video capture means 6. Any other means for identifying the movement of a physical object in a defined space can be used for analysing the motions and these are solutions which can be used. In a particular implementation, two cameras are associated together in order to obtain an optimum accuracy in the motion analysis. In one embodiment, the video capture means can have, with the display medium 5, a positive angle as illustrated by FIG. 6.

Such analysis is sent back 7 to terminal 2 which will in turn process such data in relation with the information of correlation between the image 5, the areas composing it and the values associated thereto.

The result of this authentication will decide on the further action given to the user's request.

Figure 2:
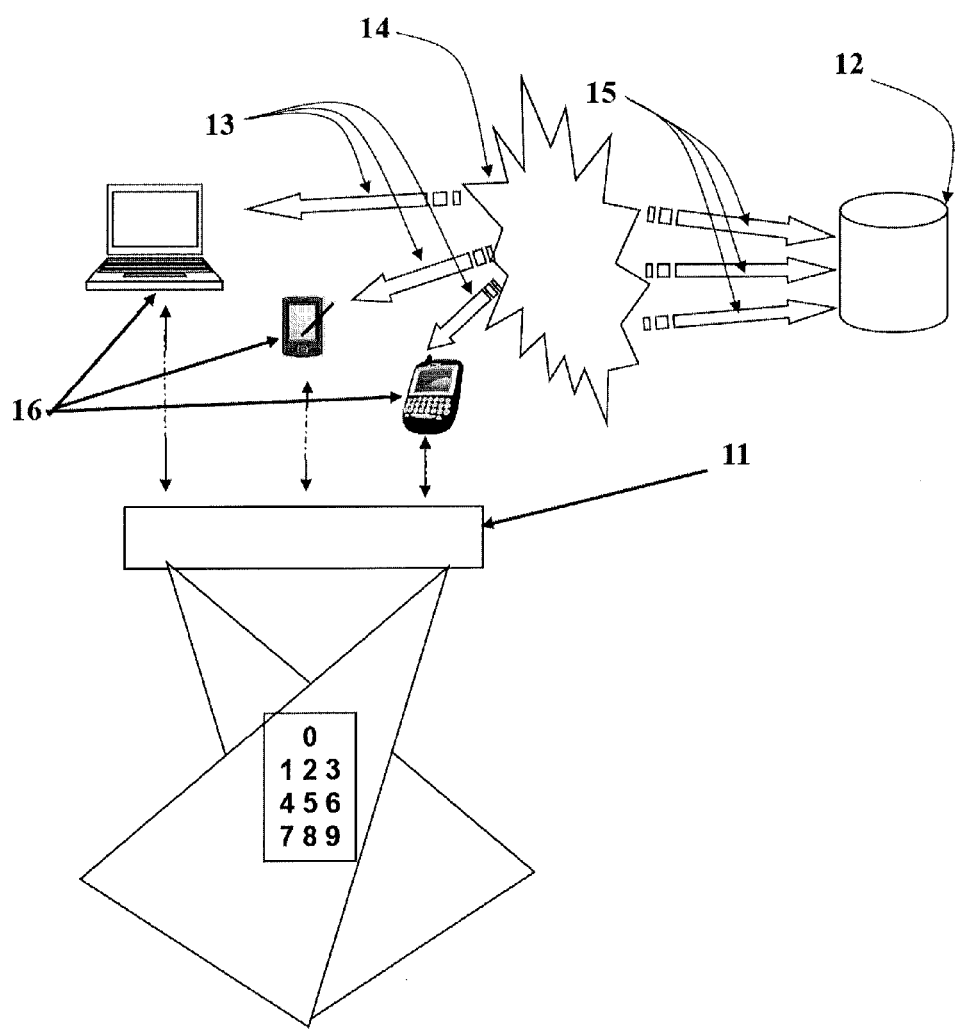
FIG. 2 shows an exemplary implementation of the invention with an intermediate device intended for establishing the communication between the terminal and the server.

FIG. 2 illustrates an implementation of the invention wherein the terminal 11 is in relation with the server 12 thanks to a communicating electronic device 16, which is itself able to communicate with the server 12 through a network 14, for example radiotelephony. This embodiment is particularly adapted to the case where the communicating electronic device and the server offer the user a service requiring a high authentication, for example a banking service. Considering the large diversity of the communicating electronic devices, it is very difficult for the server to build the security of the service on a device which is it does not control and for which is not able to guarantee safety. By associating the terminal with the electronic device, the server authenticates the user through the communication channel represented by the electronic device without being afraid of possible security flaws therein. As a matter of fact, the communicating device as well as the terminal, sees an image sent in one direction and positions sent in another direction, but without having information making it possible to correlate both and to extract operational values therefrom. In a particularly advantageous mode of the embodiment, the terminal has authentication means which are its own and can be authentified with the server so that the exchanges 13 and 15 can be carried out through a secured communication channel, for example using a session key, which still reinforces the system safety.

In FIGS. 3, 4 and 5 various exemplary images can be seen which can be used according to the invention. FIG. 3 illustrates the case where the areas composing the images are mixed together, so that the geography of the virtual keyboard shown by the images changes. Similarly, FIG. 4 illustrates the case where geography of the "virtual keyboard" remains unchanged, but the values of the areas are rearranged. Both techniques can advantageously be combined to vary both the organisation of areas and their sequences. In a particularly interesting embodiment of the invention, during each session the sent image is either selected among a pre-defined list of images, or generated. This precaution makes it possible to get protection against a possible recording of exchanges between the terminal and the server during several sessions, and to make a correlation between the information supplied by each recording.

FIG. 5 shows an exemplary image through which information is input through a symbolic convention. For example, the image can represent a series of colours and the convention between the user and the server is that the user must select the blue, green and red colours.

FIG. 6 illustrates an implementation of the invention wherein the means for analysing the motions at the periphery of the projection of the image according to the invention makes a positive angle with the supporting angle. The terminal according to the invention is shown in FIG. 6 by the element 51. In this example, the terminal 51 projects an image 55 onto a plane 56. This plane can for example be a plane surface on which the terminal will be positioned. The terminal further has means 52 for analysing motions. As illustrated by the symbolic axis 53, this means is oriented so as to analyse motions at the direct periphery of the projection 55 of the image. FIG. 6 illustrates the particularly advantageous case where the analysis means 52 has an angle 54 which is positive to the surface of projection 56. This particular implementation significantly increases the performances of the motion analysis. An angle 54 close to 90 degrees will give large facilities for an analysis.

Figure 7:
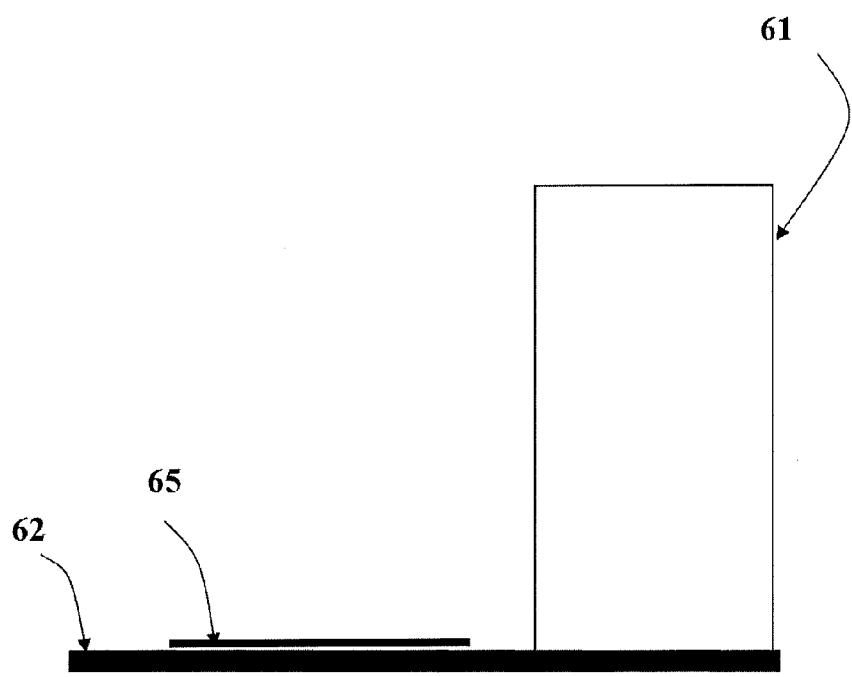
FIG. 7 is an illustration of an implementation of the invention where the projection of the image is on a surface sensitive to pressure.

In another embodiment, FIG. 7 illustrates the case where the device 61 projects an image 65 according to the invention on a surface 62 sensitive to pressure. This surface 62 will then be able to identify the places where the user puts his fingers on the surface thereof and to restitute this analysis to the terminal 61.

An additional advantage of the invention is that, contrary to the standard inputting means, the use of an input terminal according to the invention leaves no trace on the keyboard after it has been used, since the disappearance of the image eliminates any reference at the same time. Similarly, it is not possible to study a possible wearing of the keys in order to deduce possible information therefrom.

The invention claimed is:

1. A method for inputting a text in a distributed system that comprises at least a secured device or server communicating with at least one electronic device or terminal, wherein the method includes:
   a step of pre-calculation wherein at least a look-up table is created between an image, at least an area in said image, and at least a value,
   a step of transmission of said image from said server to said terminal,
   a step of projection by said terminal of said image to a user,
   a step of identification of the positions in space of the user's fingers in relation with said projection of said image,
   a step of restitution of said positions in space to said server, and
   a step of interpretation by the server of the received positions in relation with said at least one look-up table in order to obtain candidate values.

2. A method according to claim 1, wherein said projection is executed against a surface which is used as a screen.

3. A method according to claim 1, wherein said image shows several geometrically distinct areas.

4. A method according to claim 3, wherein said image defines a set of keys.

5. A method according to claim 1, wherein said look-up table makes it possible to apply said positions to a second image.

6. A method according to claim 1, wherein said look-up table makes it possible to apply shifts to said positions in order to obtain corrected positions.

7. A method according to claim 1, wherein said image is selected from among a list of images saved in a memory which can be accessed by said server.

8. A method according to claim 1, wherein said image is generated in a step preceding said pre-calculation step.

9. A terminal for inputting text in relation with at least one secured device or server, wherein the terminal includes means for:
   receiving, from said server, an image
   projecting said image onto a medium for receiving by a user
   identifying the positions in space of the user's fingers in relation with such projection of said image
   restituting said positions in space to said server.

10. A terminal for inputting text according to claim 9, wherein said means for identifying the positions in space of the user's fingers are video capture means.

11. A terminal for inputting text according to claim 9, wherein said means for identifying the positions in space of the user's fingers are pressure sensors positioned in said projection medium.

12. A terminal for inputting text according to claim 9, wherein said means for identifying the positions in space of the user's fingers are radar emitters and receivers.

* * * * *